United States Patent [19]

Pensa

[11] 4,035,106

[45] July 12, 1977

[54] CONTROL DEVICES FOR REVERSIBLE FLOW VARIABLE CAPACITY HYDRAULIC MACHINES

[75] Inventor: Carlo Pensa, Esino Lario, Como, Italy

[73] Assignee: Massey-Ferguson Services N.V., Curacao, Netherlands Antilles

[21] Appl. No.: 632,876

[22] Filed: Nov. 17, 1975

[30] Foreign Application Priority Data

Nov. 18, 1974 United Kingdom ............ 49871/74

[51] Int. Cl.² ......................................... F04B 1/26
[52] U.S. Cl. .............................................. 417/222
[58] Field of Search ........................ 417/218–222; 91/505, 506, 6.5; 92/13.1

[56] References Cited

U.S. PATENT DOCUMENTS 3,958,496  5/1976  Wallin .............................. 417/222

Primary Examiner—Carlton R. Croyle
Assistant Examiner—G. P. LaPointe
Attorney, Agent, or Firm—Thomas P. Lewandowski

[57] ABSTRACT

A signal is transmitted from a oscillatable piston to a valve by a mechanism comprising a first link pivotal about a second axis and a second link pivotal about a third axis which is perpendicular to the second axis. The second link abuts the first link on both sides of the second axis to transmit motion from the first link to the valve.

7 Claims, 3 Drawing Figures

CONTROL DEVICES FOR REVERSIBLE FLOW VARIABLE CAPACITY HYDRAULIC MACHINES

This invention relates to control devices for hydraulic machines.

It is known to provide control devices for variable capacity hydraulic machines in which the capacity of the machine is sensed by the position of a control member connected to the adjusting means from a datum. Such a device is shown in U.K. Pat. No. 1,307,914 in which a bellcrank is acted upon by a piston to rotate the bellcrank about a pivot against the force of a spring. Rotation of the bellcrank operates a valve which controls a servo motor operable to adjust the capacity of the hydraulic machine. The piston moves with the adjusting means of the machine so that the moment rotating the bellcrank is proportional to the product of the pressure delivered by and flow rate of the machine. In this way the power consumption of the machine is maintained below a predetermined level.

In order to use such a device with a reversible machine, i.e. a machine in which the direction of flow through the machine can be reversed, it is necessary to provide a mechanism which imparts unidirectional movement to the valve for increases in power consumption irrespective of which side of a zero flow rate position the adjusting means may be.

It is an object of the present invention to provide such a mechanism.

According to the present invention there is provided a mechanism interconnecting an assembly movable along a first axis between chosen limits and a hydraulic valve, said mechanism comprising a first link pivotally mounted intermediate its ends so as to pivot about a second axis which is not parallel to the first axis and a second link mounted to pivot about a third axis and to abut said link on both sides of said second axis to transmit motion from said first link to said valve.

Preferably said second link is provided with protrusions to abut said first link on both sides of the pivot axis of said first link.

Preferably also said assembly includes a piston slidably mounted within said assembly about an axis substantially mutually perpendicular to but displaced from the pivot axes of said first and second links.

An embodiment of the invention will now be described by way of example only with reference to the accompanying drawings in which FIG. 1 is a perspective and cut away view of a control device for a hydraulic machine.

Figure 1:
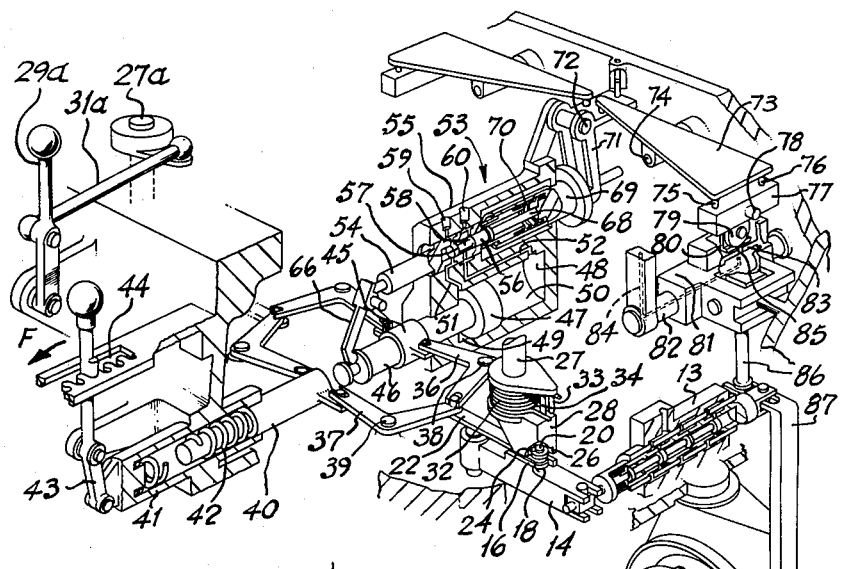
Figure 1:
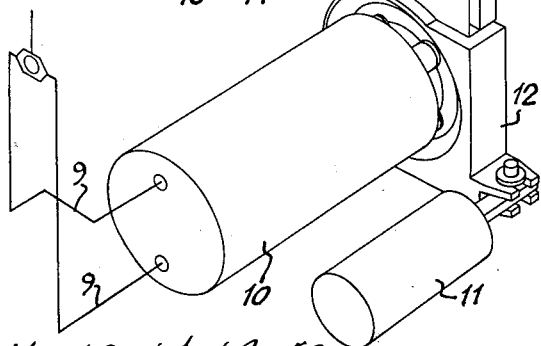
Figure 2:
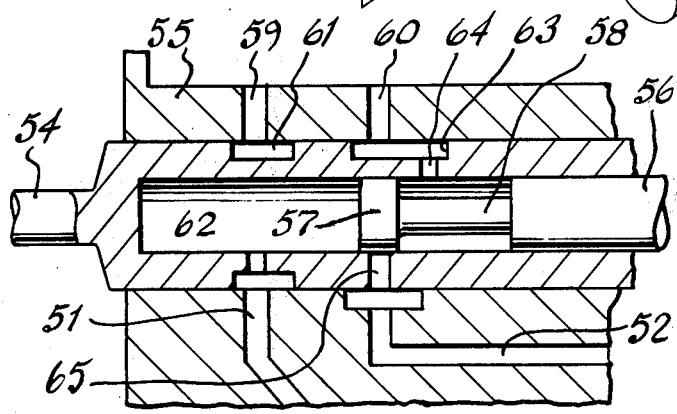
FIG. 2 is an enlarged sectional view of a control valve shown in FIG. 1.
Figure 3:
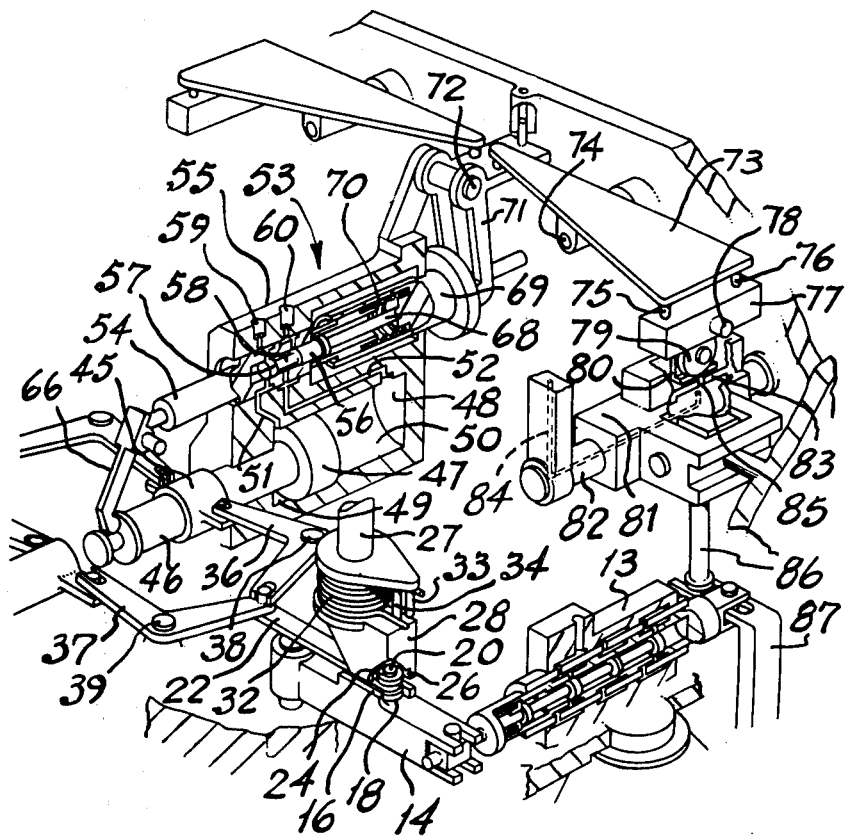
FIG. 3 is an enlarged view of a portion of the control device of FIG. 1.

For the sake of clarity one machine and its associated controls form the major part of the drawing. However, it is to be understood that a plurality of machines may be provided each with its controls. Also where similar elements to those shown in the drawings are associated with other machines appropriate suffixes have been added to the reference numerals.

A hydraulic machine 10 is provided with a swashplate 12 for varying the capacity thereof. The swashplate 12 is moved by a servo motor 11 which is controlled by a servo valve 13. Movement of the servo valve 13 is controlled by a pivoted arm 14 which is provided with a track 16. A roller 18 slides in the track 16 and is connected by a pin 20 to link 22. The pin 20 also carries a second roller 24 which engages a track 26 in an arm 28. The arm 28 is rotatably mounted on a shaft 27. This in turn is rotatable by a manual control lever 29a acting through a link 31a. The suffixed reference numerals are used for illustration in this instance due to the deliberate emission for the sake of clarity of the corresponding counterparts 29 and 31.

A torsion spring 32 is disposed around the shaft 27 and engages a pair of studs 33, 34 respectively connected to the shaft 27 and the arm 28.

The link 22 is connected to a pair of bellcranks 36, 37 which are pivotally mounted on pins 38, 39 respectively. The bellcrank 37 is connected to a rod 40 which is slidably mounted within a cylinder 41 containing a spring 42 which acts between the cylinder 41 and the rod 40. The cylinder 41 is itself slidably mounted within the transmission casing and connected to a manual control lever 43 which moves within a serrated slot 44.

The bellcrank 36 of connected to a collar 45 which slides on a piston rod 46. The piston rod 46 is connected to a piston 47 which is slidable within a cylinder 48 and divides the cylinder 48 into two chambers 49, 50 to constitute a form of motor means.

Flow to or from the chambers 49, 50 via ducts 51, 52 respectively is controlled by valve means such as a valve assembly 53. The valve assembly 53 comprises a sleeve 54 slidably mounted in a casing 55 and a spool 56 slidable within the sleeve 54 and having a land 57 and an annular recess 58. The casing 55 is provided with a pressure supply port 59 and a fluid return port 60.

The supply port 59 opens into an annular groove 61 on the outside of the sleeve 54 which supplies fluid to the duct 51 and to the inside of the sleeve 54 by way of a cross drilling 62. The return port 60 opens into an axial groove 63 on the outer surface of the sleeve 54 and a cross drilling 64 connects the groove 63 with the inside of the sleeve 54. The duct 52 is connected to the inside of the sleeve 54 by a port 65 in the sleeve 54.

The sleeve 54 extends axially at one end to abut a lever 66 which is pivotally mounted on a pin 67 intermediate its ends. The lever 66 also abuts the end of the piston rod 46.

The spool 56 is connected by a rod 68 to a hollow cylinder 69 which is slidably mounted within the casing 55 and contains a spring 70 acting between the sleeve 54 and the cylinder 69.

A bellcrank 71, pivotally mounted on a pin 72 fixed to the casing 55, acts between the end of the cylinder 69 and a plate 73.

The plate 73 is pivoted intermediate its ends on an pin 74 and is provided at the end opposite the bellcrank 71 with a pair of studs 75, 76 to constitute a form of interconnecting mechanism between the valve assembly 53 and an assembly movable conjointly with the swash plate 12 described below. The studs 75, 76 abut a pivoted bar 77 at an equal distance either side of a fulcrum 78.

A roller 79 rolls along the underside of the bar 77 and is rotably mounted in a carriage 80 mounted within a block 81. The block is slidable along a rod 82 and the carriage 80 is mounted so as to move with the block 81 along the axis of the rod 82 but may move independently of the block 81 in a radial direction. A piston 83 is mounted in the block 82 so as to abut the carriage 80 and slide radially.

Fluid delivered by the machine 10 is supplied to the underside of the piston 83 by a duct 84 in the rod 82 which opens into an annular recess 85 in the block 81 adjacent the piston 83. The preceding two paragraphs describe the assembly movable conjointly with the swash plate 12.

The block 81 is moved along the rod 82 by a finger 86 connected between the block 81 and an extension 87 of the swashplate.

The operation of the device will now be described assuming the controls are in the position shown and that the machine 10 is in zero flow or neutral position.

The lever 29 is moved in the direction of the arrow F, causing the shaft 27 and the stud 33 to rotate and stress the spring 32. The spring 32 engages the stud 34 and causes the arm 28 to rotate with the shaft 27. The tracks 26 engage the roller 24 and cause the link 16 to rotate and displace the spool of the servo valve 13. The servo motor then moves to rotate the swashplate 12 about its pivot and increase the capacity of the machine 10 so as to cause or permit fluid to flow in the conduits 9 depending on which direction in which the machine 10 is actuated. The extension 87 moves with the swashplate 12 and moves the sleeve of the spool 13 to return the valve to a neutral condition.

The finger 86 is also moved by the extension 87 and causes the block 81 to slide along the rod 82. The roller 79 is thus moved along the bar 77 away from the pivot 78.

The piston 83 is subjected to the pressure existing in conduit 9 by way of duct 84 and the recess 85 and so a moment is developed which acts so as to turn the bar 77 anticlockwise about the pin 78. The bar 77 abuts the stud 76 and acts to move the plate 73 anticlockwise about the pin 74. It will be seen that since the distance of the roller 79 from the pin 78 is proportional to the capacity of the machine 10, the moment acting on the bar 77 is proportional to the power consumption of the machine (i.e. the product of its pressure and capacity). Thus the force exerted by the plate 73 on the bellcrank 71 is proportional to the power consumed by the machine 10. Similarly the force exerted by the plate 73a on the bellcrank is proportional to the power consumed by the pump 10a.

Hence the net force imposed by the bellcrank 71 on the cylinder 69 is proportional to the power consumed or dispensed by the machines 10, 10a.

Movement of the cylinder is opposed by the spring 70 which is arranged so that when the power consumed by the pumps 10, 10a is equal to the arbitary maximum e.g. that which can be delivered by the prime mover, the land 57 blocks the port 65 and prevents flow from the chamber 50.

Should the power consumption rise above that delivered by the prime mover, the spool 56 moves so as to uncover the port 65 and allow fluid to flow from the chamber 50 into the recess 58, through the drilling 64 to the return port 60. The piston 47 thus moves along the cylinder 48 to increase the volume of the chamber 49. The piston rod 46 picks up the collar 45 and rotates the bellcrank 36 clockwise about the pin 38.

The link 28 moves the rollers 18, 24 along the tracks 16, 26. Since the arms 14 and 28 are not pivoted on the same axis, the tracks 16, 26 will not be parallel and so the arm 14 will be moved anticlockwise about its pivot. This movement will displace the spool of the servo valve 13 to cause the servo motor 11 to decrease the capacity of the pumps 10, 10a. The block 81 will be moved along the rod 82 so that the roller 79 moves toward the pivot 78. The force acting on the cylinder 69 thus decreases to the value corresponding to maximum power delivery of the prime mover.

Movement of the piston rod 46 is relayed through the lever 66 to allow the sleeve 54 to move along the casing 55 and so return the land 57 into alignment with the port 65 to prevent further flow through the duct 52. At the same time the spring 70 is returned to its nominal length so that the force that is proportional to the maximum power consumption of the pumps 10, 10a, balances the spool 58 in a neutral position.

Similarly should the power consumption drop, the force exherted by the levers 73, 73a will decrease allowing flow from the port 65 to the port 63. There will thus be equal pressure on each side of the piston 47 and due to the greater effective surface area of the chamber 50, the piston 47 will move to decrease the volume of the chamber 49 and increase the capacity of the machines 10, 10a up to the maximum determined by the control lever 43.

It will be seen that the arrangement of the plate 73 and the bar 77 together with their respective pivot axes is such that which ever side of the pin 78 the roller 79 moves, i.e. which ever direction fluid is flowing through the machine 10, an unidirectional force is transmitted to the bellcrank 71 from the plate 73. This is because rotation of the bar 77 in either direction about its fulcrum 78 will displace either the stud 75 or 76 to rotate the plate anticlockwise about the pin 74. Further, since the studs 75, 76 are equidistant from the fulcrum 78 and they provide point contact between the plate and bar 77 the force transmitted to the plate 73 is directly proportional to the moment exerted on the bar 77 by the roller 79. Should it be required to modify the relationship so that the force transmitted to bellcrank 71 is not directly proportional to the moment exerted on the bar 77, the surface of either the bar 77 or the plate 73 may be formed with a cam so that the point of contact between the bar 77 and the plate 73 varies. In this way a small displacement of the bar 77 can be made to cause a large displacement of the spool 56 to enable a rapid response to changes in power consumption.

By varying the position of the pin 74 along the plate 73, the forces transmitted to the bellcrank can be amplified or reduced so that the valve 53 is subjected to the range of forces for its optimum operation, so avoiding unnecessary expensive design of components.

What we claim is:

1. Hydraulic apparatus comprising a hydraulic machine having an inlet and outlet for flow of fluid to and from said machine, an adjusting member for varying the capacity of said machine, motor means operative to cause movement of said adjusting member, a motor for moving said adjusting member, servo valve means for directing movement of said motor, means connecting said servo valve means with said motor means for moving said servo valve means by said motor means, valve means controlling movement of said motor means, an assembly movable conjointly with said adjusting member along a first axis and a mechanism interconnecting said valve means and said assembly, said mechanism including a first link pivotally mounted intermediate its ends so as to pivot about a second axis, said second axis not being parallel to said first axis, and a second link mounted to pivot about a third axis and to abut said first link on both sides of said second axis to transmit motion from said first link to said valve in response to outlet fluid pressure.

2. The apparatus of claim 1 wherein said second link is provided with protrusions to abut said first link on both sides of the pivot axis of said first link.

3. The apparatus of claim 1 wherein said first and third axes are parallel and said second axis is perpendicular to said first and third axes.

4. The apparatus of claim 1 wherein said assembly includes a piston mounted within said assembly to slide along a fourth axis which is substantially mutually perpendicular to but displaced from said second and third axes.

5. The apparatus of claim 4 wherein a roller is mounted in a carriage and abuts said first link, said carriage being slidably mounted for movement along said fourth axis and abutting said piston for movement therewith.

6. The apparatus of claim 4 wherein said piston is hydraulically connected to said fluid pressure conduit of said hydraulic machine, said piston thereby transmitting a force to said first link proportional to the pressure in said line.

7. The mechanism of claim 6 wherein resilient means oppose movement of said valve means.

* * * * *